United States Patent
Adeel et al.

(10) Patent No.: US 12,482,111 B2
(45) Date of Patent: Nov. 25, 2025

(54) MULTIMEDIA OBJECT TRACKING AND MERGING

(71) Applicants: Getac Technology Corporation, New Taipei (TW); WHP Workflow Solutions, Inc., North Charleston, SC (US)

(72) Inventors: Muhammad Adeel, Edina, MN (US); Thomas Guzik, Edina, MN (US)

(73) Assignees: Getac Technology Corporation, New Taipei (TW); WHP Workflow Solutions, Inc., North Charleston, SC (US)

( * ) Notice: Subject to any disclaimer, the term of this patent is extended or adjusted under 35 U.S.C. 154(b) by 614 days.

(21) Appl. No.: 17/877,639

(22) Filed: Jul. 29, 2022

(65) Prior Publication Data

US 2024/0037761 A1 Feb. 1, 2024

(51) Int. Cl.
*G06T 7/246* (2017.01)
*G06V 10/74* (2022.01)

(52) U.S. Cl.
CPC ............. *G06T 7/246* (2017.01); *G06V 10/74* (2022.01); *G06T 2207/10016* (2013.01); *G06V 2201/10* (2022.01)

(58) Field of Classification Search
None
See application file for complete search history.

(56) References Cited

U.S. PATENT DOCUMENTS

| 7,839,431 B2 * | 11/2010 | Swarr | G06T 7/74 348/94 |
| 11,265,469 B1 * | 3/2022 | Gangwal | H04N 23/683 |

(Continued)

OTHER PUBLICATIONS

U.S. Appl. No. 17/344,409, Notice of Allowance mailed Jul. 17, 2023, 28 pages.

(Continued)

*Primary Examiner* — Soo Shin
(74) *Attorney, Agent, or Firm* — Finnegan, Henderson, Farabow, Garrett & Dunner, L.L.P.

(57) ABSTRACT

In multimedia object tracking and merging of tracked objects, an object is tracked through frames of multimedia content until a frame appears in which the tracked object is not detected. A first track is designated as one or more consecutive frames in which the tracked object is detected, the first track ending at the first frame. Tracking continues to try to detect the tracked object in a second frame subsequent to the first frame. If the tracked object is not again detected, information about the first track is output. If the tracked object is detected subsequently, a second track of consecutive tracked object detection is designated. The tracked objects in the two tracks are then compared with the aid of trained data models, and a matching score is determined to reflect the degree of match. If the matching score meets or exceeds a first threshold, the compared tracks are merged using the same identifier assigned to both tracks. If the matching score does not exceed a second threshold that is less than the first threshold, the tracks may be discarded as showing no match. If the matching score falls between the first and second thresholds, an indication is output for further analysis of the compared tracked objects.

20 Claims, 11 Drawing Sheets

(56) References Cited

U.S. PATENT DOCUMENTS

| | | | | |
|---|---|---|---|---|
| 2005/0280707 A1* | 12/2005 | Sablak | ............... | H04N 23/6845 |
| | | | | 348/E5.046 |
| 2014/0050455 A1* | 2/2014 | Ni | ........................ | H04N 7/181 |
| | | | | 386/E5.028 |
| 2015/0178953 A1* | 6/2015 | Gao | ................... | G06F 3/04842 |
| | | | | 345/681 |
| 2018/0189600 A1* | 7/2018 | Astrom | ................... | G06T 7/292 |
| 2020/0388030 A1* | 12/2020 | Steelberg | ............... | G06V 20/46 |
| 2021/0110168 A1* | 4/2021 | Yang | ..................... | G06V 20/46 |
| 2022/0076022 A1* | 3/2022 | Khadloya | .............. | G06V 20/46 |

OTHER PUBLICATIONS

U.S. Appl. No. 17/344,409, Office Action mailed Jan. 19, 2023, 23 pages.
International Patent Application No. PCT/US2023/028379, International Search Report and Written Opinion mailed Nov. 6, 2023, 9 pages.

* cited by examiner

MULTIMEDIA OBJECT TRACKING AND MERGING

BACKGROUND

This application incorporates by reference the entire disclosure of U.S. patent application Ser. No. 17/344,409, entitled "Facilitating Object Tracking for Portable Camera Images," filed Jun. 10, 2021.

Law enforcement agencies provide officers and agents with an assortment of devices—electronic and otherwise—to carry out duties required of a law enforcement officer. Such devices include radios (in-vehicle and portable), body-worn cameras, weapons (guns, Tasers, clubs, etc.), portable computers, and the like. In addition, vehicles such as cars, motorcycles, and bicycles may be equipped with electronic devices associated with the vehicle, such as vehicle cameras, sirens, beacon lights, spotlights, and personal computers.

It is increasingly common for law enforcement agencies to require officers to activate cameras (body-worn and vehicle-mounted) that enable officers to capture multimedia content (e.g., audio and/or video contents) of incidents in which an officer is involved. A variety of other content sources, including (but not limited to) recording devices such as drone-mounted cameras, security cameras, and/or the like may also capture multimedia content. Among other advantages, these provide a way to preserve evidence, that would otherwise be unavailable, for subsequent legal proceedings. This evidence greatly aids in the investigation of criminal activities, identification of perpetrators of crimes, and an examination of allegations of police misconduct, to name a few advantages.

It is also desirable to further investigate the incidents based on the captured multimedia content. In a network environment setting where different devices from different places can be used to consume and investigate the captured multimedia content, there is a need to maintain consistent reliability and identification of consumed audio and/or video contents.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
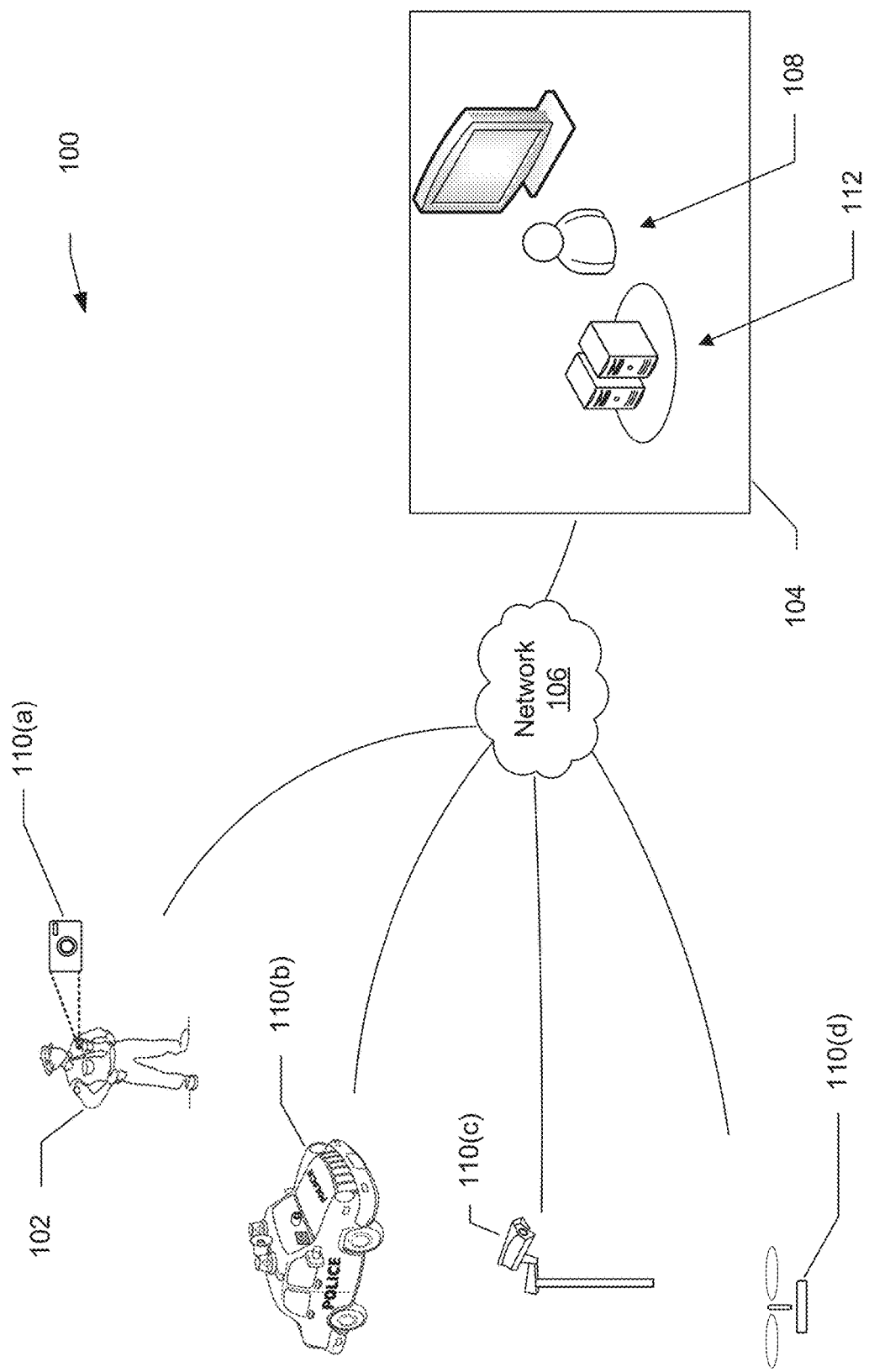
FIG. 1 illustrates a schematic view of an example environment that implements an object tracker to identify, track, and tag an object within multimedia content received from a multimedia content source device.

This disclosure describes techniques for reducing a volume of multimedia content to a manageable amount in which a tracked object is detected.

When a scene is recorded, such as by a law enforcement officer using a bodycam or other recording device, a substantial volume of multimedia (video and/or audio) content may be captured. This content may contain a wealth of valuable information that can be used for a variety of purposes such as substantiating an account of a crime scene, verifying procedures, or evidence gathering to name a few. The captured information may include information that is directly relevant to the purpose of the recording (e.g., establishing context of a dangerous encounter or verification that the law enforcement officer was wearing a required bodycam), information that may become relevant (e.g., that a traffic accident occurred during a heavy rain or an individual exhibited irregular behavior), or has no relevance at all to the scene or purpose of the recording (e.g., an innocent bystander or a license plate of a car that is in the field of view by coincidence).

It may be that there is particular interest in one or more objects known, suspected, or possible to appear in the captured multimedia content. A human analyst could spend a great deal of effort manually scanning all of the captured content, looking for the object or objects. Such scanning could take a very long time, depending on the amount of content, and exact a physical toll that might render the results of the scanning deficient or questionable. An automated scanning system can perform a level of object recognition, but accuracy of the results may be influenced by a limited ability to make a binary yes/no determination, as well as inaccuracy in the zone of recognition where confidence in the result may be reduced (e.g., no better than "more likely than not" or vice versa). Furthermore, and particularly with respect to these latter situations, even if a human analyst were to be brought in for a manual scan of the results, to ensure accurate positive or negative recognition (i.e., lack of recognition or false positive), even a reduced amount of content, where certain negative results can be rejected, may leave a great amount of content to be reviewed.

In an example of a traffic stop, the law enforcement officer may be required by law or department policy to wear a bodycam and activate it before leaving the squad car. On approaching the driver's side door, the officer may as a best practice stand behind the driver and request the driver's license and vehicle registration. The bodycam may be positioned to record this transaction and the surrounding environment within a limited field of view. In this example, the field of view may include some of the exterior of the vehicle and some of the interior of the vehicle, sufficient to indicate weather conditions and the driver's actions, for example.

From the time that the bodycam is activated until the time that the traffic stop concludes, a large amount of multimedia content may be captured. In a routine stop, this content may contain little of value unless the driver challenges the stop and the content then becomes evidence in an investigation or court case. In either circumstance, the multimedia content may be streamed and/or uploaded to a remote location for analysis and/or storage and later analysis as needed.

Now suppose that, rather than a routine exchange of the driver's license and registration, the officer notices that in the glove box from which the registration was retrieved appears to be a handgun, a plastic bag with pills, and a quantity of money. At this point, the traffic stop is not routine and instead has developed into a contentious and dangerous situation. If the driver subsequently attempts to flee the scene either on foot or by driving away, the officer may give chase and ultimately bring the situation under control and make an arrest. In this example, the bodycam should have captured a substantial amount of multimedia content, from a variety of angles and of varying quality, from the time that the officer left the squad car until the bodycam is turned off, presumably after re-entering the squad car with the driver securely in the back seat.

Later, the multimedia content, if not also streamed to a remote location (e.g., data storage accessible by the police department), may be transmitted to or uploaded at the remote location. The multimedia content may contain valuable information related to weapons violations, drug possession, and assault, and also other information relevant to ensuring that the officer followed proper procedures, provenance of the drugs and money (e.g., that it was not planted by the officer), and contextual information that may need to be considered as evidence during prosecution or plea bargaining, for example. The bodycam may also have captured extraneous content such as vehicles driving by or nearby onlookers.

It is evident that, given even this relatively simple illustration, a rather large amount of multimedia content can be created. If there is a need to determine whether any particular object, condition, or context existed at the time of the incident, a substantial task awaits the system or human to examine the content for presence of the same. A system or technique for reducing the amount of content to review, in particular review by a human analyst, saves both time and effort. In some examples, a scan for object recognition and analysis of the results to classify the results as a statistically likely recognition, a statistically unlikely recognition, and ambiguous, as determined by a machine learning model, may efficiently remove a great deal of content for review. Moreover, the combination of the automated scan/recognition results with a human analyst reviewing the ambiguous results can be highly effective as the human may need only to review a substantially reduced amount of content represented by the ambiguous results.

In at least one example, the multimedia content may be associated with corresponding searchable content to improve processing of large multimedia content from heterogeneous sources (e.g., different types of media recording devices). Searchable contents may include metadata and/or tags associated with corresponding content that can be used in law enforcement operations, evidentiary matters, and the like.

In some embodiments, machine learning models may be executed in parallel by the analytics engine or by different analytics engines of a centralized operating center server, or on different network resources that can be connected to the server. Further, the output of the models may be combined to provide an aggregate set of results data such as, for example, the presence of a tracked object, change of environmental conditions, first-time entry of an object into the viewed multimedia content, and/or the like. In such embodiments, different searchable contents may be associated with the output of different machine learning models. In some examples, an output of a first model may be used to facilitate monitoring of searchable video content while an output of a second model can be utilized to monitor streaming video content. Then, following the execution of the first and second models, the results data of each model may be aggregated to create aggregated results data that can be applied to the scoring scheme described herein.

As used herein, the terms "device," "recording device," "portable device," "electronic device," and "portable electronic device" are used to indicate similar items and may be used interchangeably without affecting the meaning of the context in which they are used. Further, although the terms are used herein in relation to devices associated with law enforcement, it is noted that the subject matter described herein may be applied in other contexts as well, such as in a security system that utilizes multiple cameras and other devices.

Implementation and operations described herein are ascribed to the use of a server; however, alternative implementations may execute certain operations in conjunction with or wholly within a different element or component of the system(s). Further, techniques described herein may be implemented in a number of contexts, and several example implementations and context are provided with reference to the following figures. The term "techniques," as used herein, may refer to system(s), method(s), computer-readable instruction(s), module(s)m algorithms, hardware logic, and/or operation(s) as permitted by the context described above and throughout the document.

FIG. 1 illustrates a schematic view of an example environment 100 that implements an object tracker to identify, track, and tag an object within multimedia content received from a multimedia content source device, e.g., a multimedia recording or streaming device. For example, a police officer 102 may record content and stream the content to a location 104 via a network 106 for viewing and analysis by an analyst 108. Multimedia content can be captured by mobile or stationary devices, examples of which may include, without limitation, a bodycam 110(a), a vehicle-mounted camera 110(b), a security camera 110(c), a camera 110(d) mounted on an unmanned aerial vehicle, and/or the like (herein, multimedia content source devices may be collectively described with reference numeral 110). In various embodiments, the multimedia content source devices may be always-on or on-off activated.

The network 106 may be or include, without limitation, a local area network ("LAN"), a larger network such as a wide area network ("WAN"), a carrier network, or a collection of networks, such as the Internet. Protocols for network communication, such as TCP/IP, may be used to implement the network 106. The network 106 may provide telecommunication and data communication in accordance with one or more technical standards.

Each of the multimedia content source devices 110 may be a video recording device, an audio recording device, or a multimedia content device that records or streams both video and audio data. In these examples, each of the multimedia content source devices 110 may transmit captured audio and/or video data and transmit the same to a server 112 at the remote location 104 via the network 106. Further, each of the media content source devices 110 may send self-identifying information such as a device ID, the name or other identification (e.g., badge number) of the law enforcement officer, type of dispatch event, and/or other information.

In some embodiments, the server 112 may be part of a facility that is operated by a law enforcement agency or a facility that is operated by a third-party that is offering services to the law enforcement agency. Utilizing components of the server 112, the analyst 108 may track objects across frames and, under certain circumstances, confirm a machine learning model that indicates continued presence of a tracked object, beginning of a track exhibiting the tracked object, and/or ending of a track exhibiting the tracked object. The server 112 may access third-party servers via the network 106 or other communication media.

Figure 2:
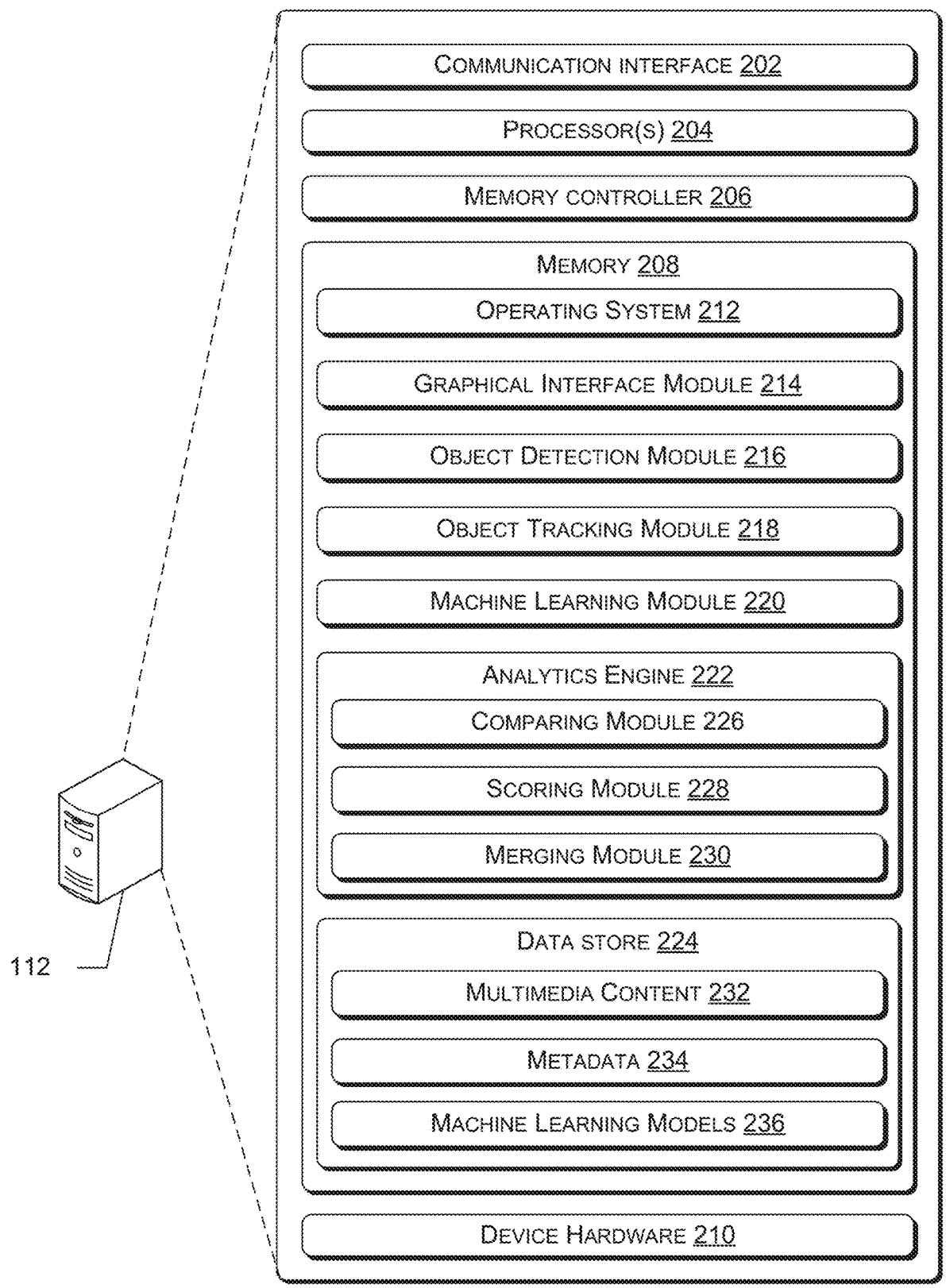
FIG. 2 illustrates an example of the server shown in FIG. 1.

FIG. 2 illustrates an example of the server 112 shown in FIG. 1. Components of the server 112 can be realized in hardware, software executed by one or more processors, or a combination thereof.

In some embodiments, the server 112 may include a communication interface 202, one or more processor(s) 204, a memory controller 206, memory 208, and device hardware 210. Utilizing resources of the server 202, the analyst 108 may perform operations that include, without limitation, review certain tracks of video frames for objects detected and tracked through the multimedia content, merge under a single file name tracks that show the object, and add the single file name to metadata of each merged track.

The communication interface 202 may include wireless and/or wired communication components that enable the server 112 to transmit data to and receive data from the multimedia content source 110 and/or other devices via a communication network such as the network 106. In some embodiments, the communication interface 202 may facilitate direct communication with the multimedia content sources 110. Communication between the server 112 and other devices may utilize a communication protocol for sending and receiving data and/or voice communications.

The processor(s) 204 and the memory 208 may implement the operating system 212. The operating system 212 may include components that enable the server 112 to receive and transmit data via various interfaces (e.g., the communication interface 202 and/or memory input/output devices), as well as process data using the processor(s) 204 to generate output. The operating system 212 may include a display component that presents output (e.g., display data on an electronic display, store the data in memory, transmit the data to another electronic device, etc.). Additionally, the operating system 212 may include other components that perform various additional functions generally associated with an operating system.

The memory controller 206 may include hardware, software, or a combination thereof, that enables the memory 208 to interact with the communication interface 202, processor(s) 204, and other components of the server 112. For example, the memory controller 206 may receive content from the communication interface 202 and send the received content and metadata to storage under control of the processor(s) 204. In another example, the memory controller 206 may retrieve instructions from the memory 208 for execution by the processor(s) 204.

The memory 208 may be implemented using computer-readable media. Computer-readable media includes, at least, two types of computer-readable media, namely computer-readable storage media and communications media. Computer-readable storage media includes, but is not limited to, Random Access Memory (RAM), Dynamic Random Access Memory (DRAM), Read-Only Memory (ROM), Electrically Erasable Programmable Read-Only Memory (EEPROM), flash memory or other memory technology, Compact Disc-Read-Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of and are not formed exclusively by modulated data signals, such as a carrier wave. In contrast, communication media may embody computer-readable instructions, data structures, program modules, or other data in a modulated data signal, such as a carrier wave, or other transmission mechanisms.

The device hardware 210 may include additional hardware that facilitates performance of the communication interface 202, data display, data communication, data storage, and/or other device functions. For example, the device hardware 210 may include a modem that enables the server 112 to perform data communication with the network 106. The device hardware 210 may further include signal converters (e.g., a digital-to-analog converter, an analog-to-digital converter), antennas, hardware decoders, and encoders, graphics processors, a universal integrated circuit card (UICC) or an embedded UICC (eUICC), and/or the like, that enable the server 112 to execute applications and provide data communication functions. In addition, the device hardware 210 may include the appropriate hardware, firmware and software to accommodate peripheral data storage or input devices, including but not limited to external storage drives, USB drives, cameras, microphones, speech recognition packages, and any other similar suitable devices.

In addition to the operating system 212, the memory 208 may store a graphical interface module 214, an object detection module 216, an object tracking module 218, a machine learning module 220, an analytics engine 222, and a data store 224. In some embodiments, the data store 224 may be located externally of the server 112.

The graphical interface module 214 may generate a graphical user interface on a display, with elements and controls shown on the display in some embodiments such that the analyst 108 may manipulate the viewing/playing of the downloaded multimedia content via input devices including but not limited to keypads, keyboards, mouse devices and touch screens.

The object detection module 216 may be configured to, in conjunction with the processor(s) 204, use one or more object recognition techniques to identify one or more objects depicted within received image data. The one or more object recognition techniques may include such techniques as edge detection, spatial pyramid pooling, Region-Based Convolutional Network (e.g., R-CNN), Histogram of oriented gradients (HOG), Region-based Fully Convolutional Networks (R-FCN), Single Shot Detector (SSD), Spatial Pyramid Pooling (SPP-net), or other suitable technique for detecting an object. In some embodiments, this may comprise the use of one or more trained machine learning models that are trained to identify one or more objects within image data. For example, such machine learning models may be trained by providing images of known objects (i.e., inputs) as well as feedback (i.e., outputs) in the form of object identifications. Suitable objects to be identified may include vehicles, persons, weapons, or other suitable object type.

The object tracking module 218 may be configured to, in conjunction with the processor(s) 204, identify frames in which an object is detected by the object detecting module 216 within a video and create tracks of frames that have the detected object, excluding frames in which the object is not detected by the object detecting module 216. In some embodiments, the object tracking module 218 uses one or more machine learning models in creating tracks in which a tracked object is detected in consecutive frames, as described in more detail elsewhere herein.

The machine learning module 220 may generate machine learning models that perform various functions for, e.g., identifying objects in video content; identifying frames in which objects to be tracked are detected; creating tracks of such tracked objects; matching tracks of tracked objects purported to be the same; and scoring the match to enable tracks to be merged automatically, disregarded automatically, or output for manual analysis.

The analytics engine 222 may be configured to be executed by the processor(s) 204 to determine whether a tracked object in different tracks is the same across the tracks and, if so, to merge the tracks containing the same tracked object. The analytics engine 222 includes a comparing module 226, a scoring module 228, and a merging module 230, in some embodiments. The comparing module 226 may input tracked object data from two tracks and compare the tracked objects to determine whether they are the same. The comparison process may include an algorithm run by a machine learning model.

The scoring module 228 may be configured to be executed by the processor(s) 204 to input the results of the comparison output by the comparing module 226 and generate a score that indicates the degree of matching. The score may be a number on an arbitrary scale, for example 1-100. In some embodiments two threshold scores may be set to divide the scale into three tiers—high, middle, and low. That is, a first threshold may be set to divide the high tier from the middle tier on the high side, and a second threshold may be set to divide the middle tier from the low tier on the low side. For example, the first threshold may be set at 70 such that the high tier is the range from 70-100, and the second threshold may be set at 30 such that the low tier is 1-30, leaving the center tier at 31-69. The thresholds are arbitrary and may be set at any level, and also may be set at different levels for different tracked objects. Scoring may be performed by an algorithm run an a machine learning model, the output of which applies the matching score based on training using historical datasets of prior matching. The model may be trained and retrained as desired based on feedback, especially manual feedback, as to the accuracy of the model. In some embodiments, tracks that match with a score in the high tier are considered to show the same tracked object, and are output to the margins module 230; tracks that have a matching score in the low tier are considered to not show the same tracked object, and are disregarded for merging; and tracks whose matching score falls in the middle tier are output for manual analysis.

The merging module 230 may be configured to be executed by the processor(s) to merge two tracks determined to track the same object. For example, two tracks that score in the high tier by the scoring module 228 may be automatically merged by the merging module 230 in response to output from the scoring module 228. In some embodiments, "merging" means assigning the same track name to each track's metadata, rendering both tracks searchable and retrievable in response to a request for the same track name. The merging module may also, or alternatively, perform the merger in response to a manual input.

The data store 224 may store multimedia content 232, metadata 234 associated with the multimedia content 232, and machine learning models 236. In some embodiments, one or more of the multimedia content 232, metadata 234, and models 236 may be stored by the server 112 and/or in another data store external to the server 112. The multimedia content 232 may include multimedia content received from one or more of the multimedia content sources 110. The metadata 234 may include a variety of information associated with the multimedia content, such as a file name; a content identifier; a track identifier for tracks determined by the object tracking module 218, the analyst 108, or another component or individual; a time-and-date stamp; annotations; and/or the like. The machine learning models 236 may include trained machine learning models trained on one or more datasets compiled from historical and/or current multimedia content using machine learning techniques.

The machine learning models 236 may include models run on data input to the object detection module 216, the object tracking module 218, the comparing module 226, the scoring module 228, and/or the merging module 230. The outputs of these respective models, individually and collectively "artificial intelligence," contribute to the efficiency and resource conservation achieved by concepts described here, especially to the extent that the models are trained to a statistical level of confidence suited to their purpose.

For example, the object detection module 216 may cause input of multimedia content data 232 to the machine learning module 220, which retrieves a suitable one of the machine learning models 236, runs the model on the input, and outputs a determination or recognition of one or more objects from images in the multimedia content. The object detection module 216 may tag the objects in the frames in which they appear, for the benefit of the object tracking module 218. In some embodiments, the determination or recognition need not identify the objects beyond their nature. For example, determining that a detected object is a person's face does not require that the person be identified.

The object tracking module 218 may cause input of the tagged video output by the object detection module 216 to the machine learning module 220, which retrieves a suitable one of the machine learning models 236, runs the model on the input, and outputs tracks created for specified tracked objects. For example, the object tracking module 218 may cause input of video comprising a series of frames tagged by the object detection module 216 to have a determined or recognized object. The machine learning module 220 may run the frames through the model, which creates tracks of frames, each having the tracked object and excluding those frames in which the tracked object was not detected, as described in more detail elsewhere herein. The tracks created by the object tracking module 218 may be output for analysis by the analytics engine 222.

The machine learning model outputs may be associated with a match score based on the accuracy of the models over time. In some embodiments, the accuracy of the models may be based on matching results over time meeting a predetermined tolerance or precision. Furthermore, the statistical level of confidence in the score may be associated with any particular match (i.e., the tracked objects are determined to be the same and the tracks merged, or different objects and the tracks not merged).

In some embodiments, with at least some of the multimedia content 232 as input dataset(s), the machine learning module 220 may be configured to train one or more of the machine learning models 232 to identify, e.g., objects in video content that can be tracked. For example, video content such as a person, body part, or article of clothing; an environmental feature such as the sun, moon, clouds, precipitation, water, or snow grass on the ground; an animal; a weapon such as a gun or knife; and the like may be detected via the training of corresponding models. In these and other examples, an output of the trained model may be compared to verified analysis of such objects, and a matching score in the yes/no determination by the model as to the sameness of the tracked object may be determined.

Figure 3:
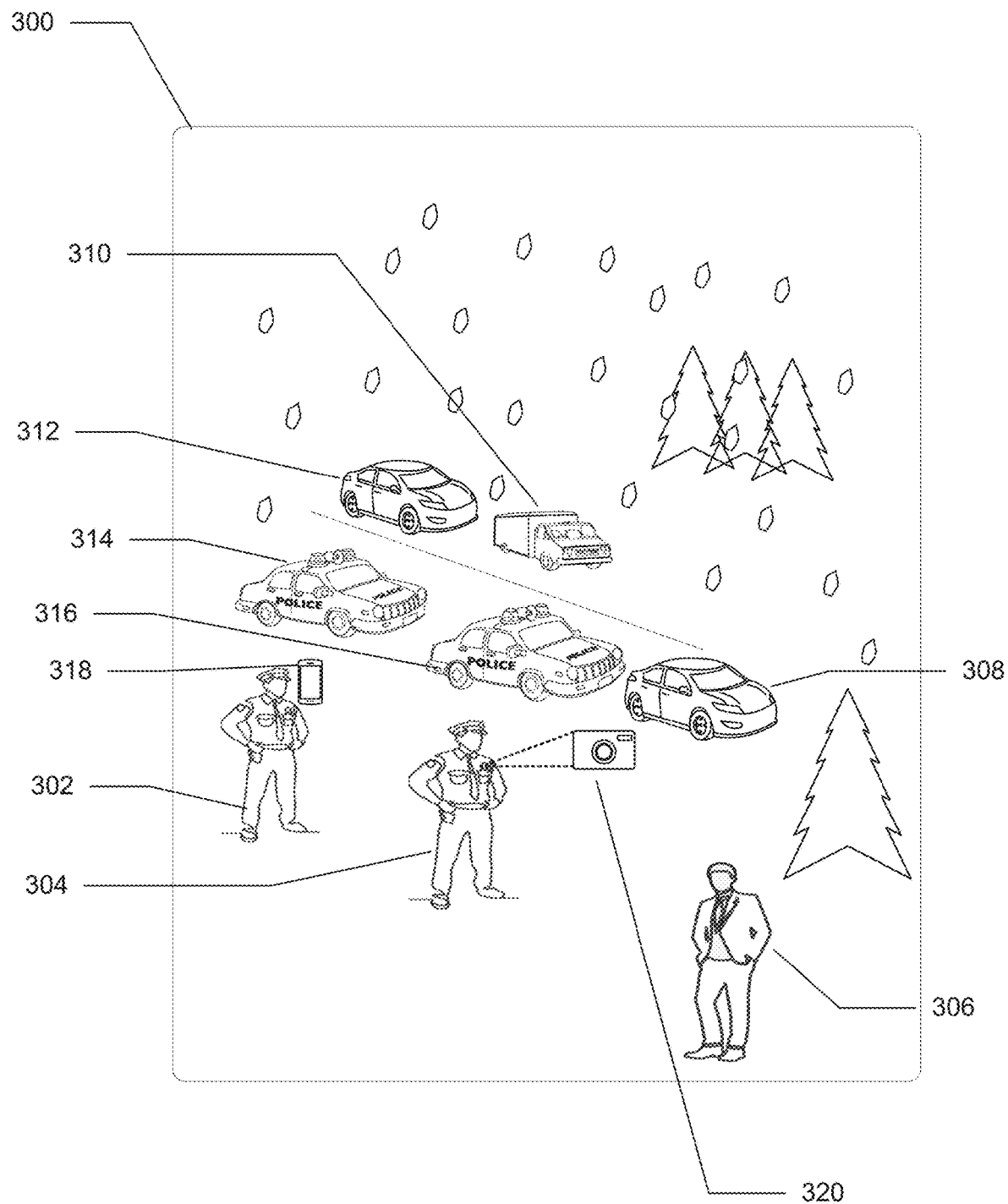
FIG. 3 illustrates an example of a display showing a frame of video content as part of a larger volume of multimedia content captured at an event, in this case a traffic stop.

FIG. 3 illustrates an example of a display showing a frame of video content as part of a larger volume of multimedia content captured at an event, in this case a traffic stop. This is but an example that reveals inventive concepts of various embodiments described herein and should not be considered limiting in its context.

FIG. 3 illustrates a frame 300 as part of multimedia content video related to a traffic stop. The video may have been captured by a recording source such as a security camera or drone-mounted camera. For the purpose of explanation, the video will be assumed to have been captured by a drone-mounted camera based on the viewing angle shown. However, there are many multimedia content sources that can capture and provide video suited for tracking and analyzing, some of which are described herein.

The frame 300 exhibits a first officer 302 and a second officer 304 approaching a driver 306, who has exited a vehicle 308. Snow is falling on the scene. A number of trees are present on both sides of the road on which two vehicles 310 and 312 are driving past the stopped vehicle 308 and squad cars 314 and 316. The first officer 302 has a telecommunications device 318 such as a radio or smartphone, and the second officer 304 is wearing a bodycam 320. Each one of these features may be candidates for tracking as tracked objects.

Figure 4A:
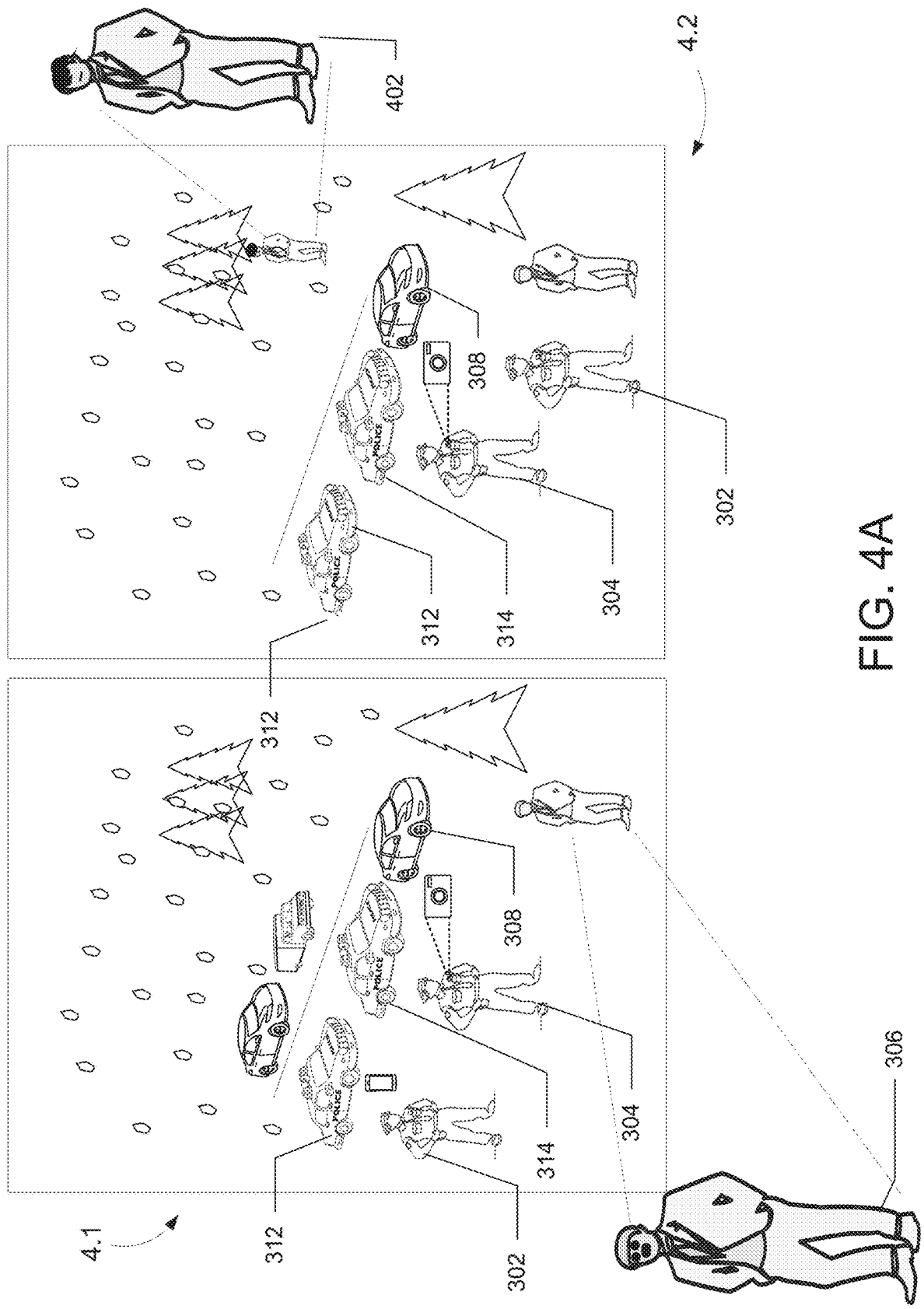
FIGS. 4A-4D illustrate video frames that may be input to one or more machine learning models to track objects.

FIGS. 4A-4D illustrate video frames that may be input to one or more machine learning models to track objects. FIG. 4A illustrates example frames 4.1 and 4.2. Frame 4.1 is the first frame in a chronological and consecutive sequence of frames 4.1-4.8 shown in FIGS. 4A-4D and is the same as the frame shown in FIG. 3, with reference numerals removed for clarity. FIG. 4.2 reveals that the first officer 302 approaches the driver 306, presumably to inquire about something related or in addition to the driver's behavior that caused the vehicle 308. It is to be noted here that the video captured by the multimedia content source 110 may or may not record audio. For the purpose of this illustration, only video is considered.

Frame 4.2 also shows a new object entering the scene, a bystander 402. The bystander 402 is evidently interested in the scene. Considering that he is facing to the left, it may be surmised that he is walking from right to left in the view, although the frame is not conclusive. As opposed to the driver 306, who sports light hair and a mustache, the bystander 402 has dark hair and is clean-shaven. The remainder of the view shown in frame 4.2 is substantially the same as frame 4.1.

Figure 4B:
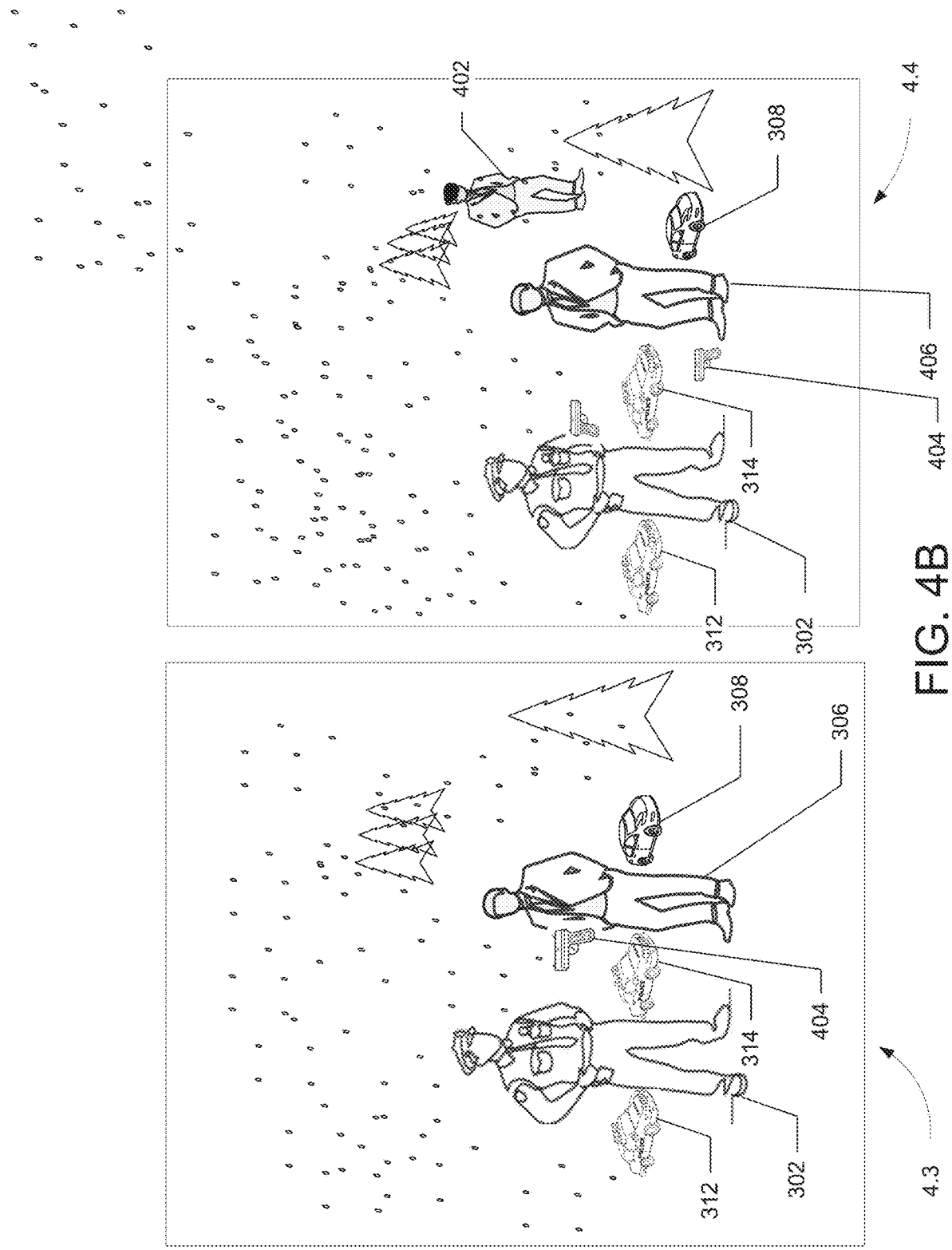
Figure 4C:
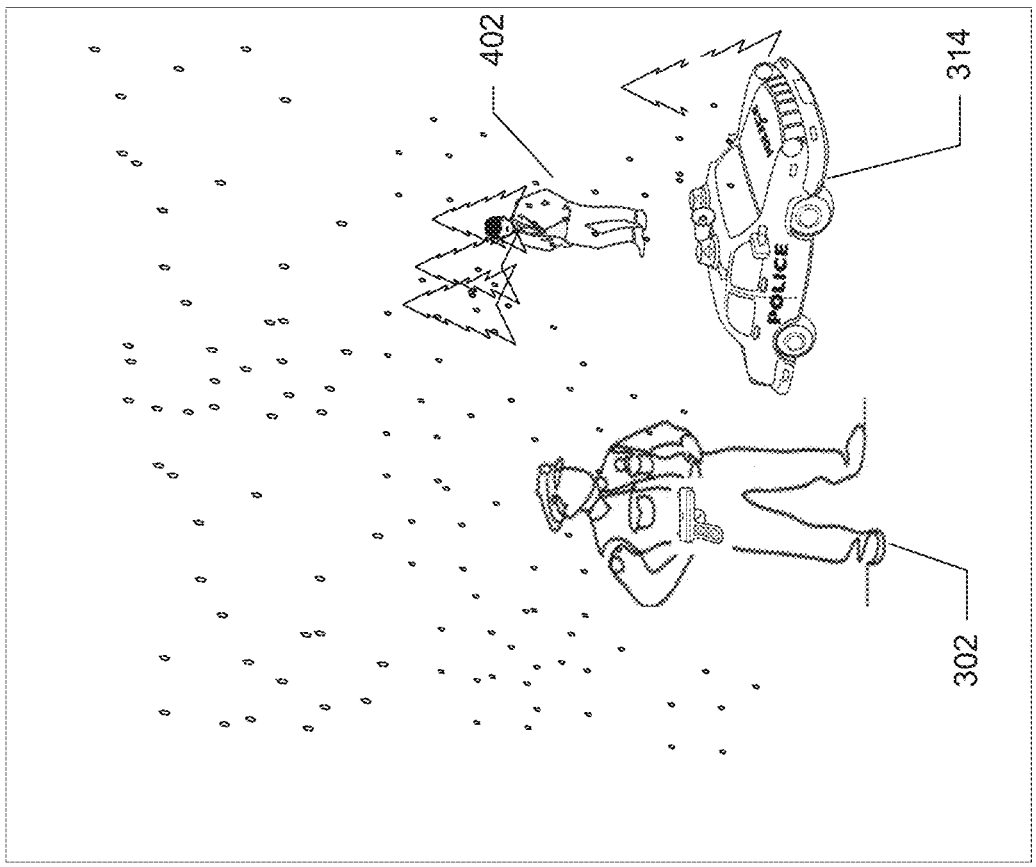
Figure 4C:
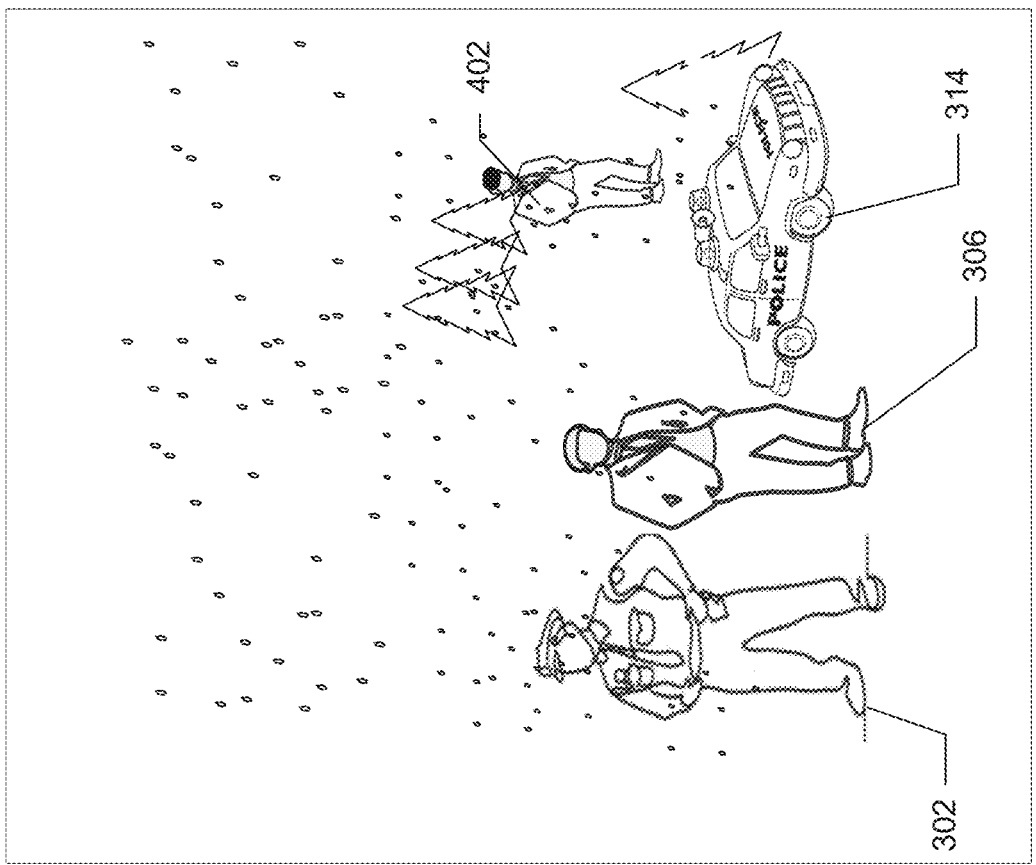
Figure 4D:
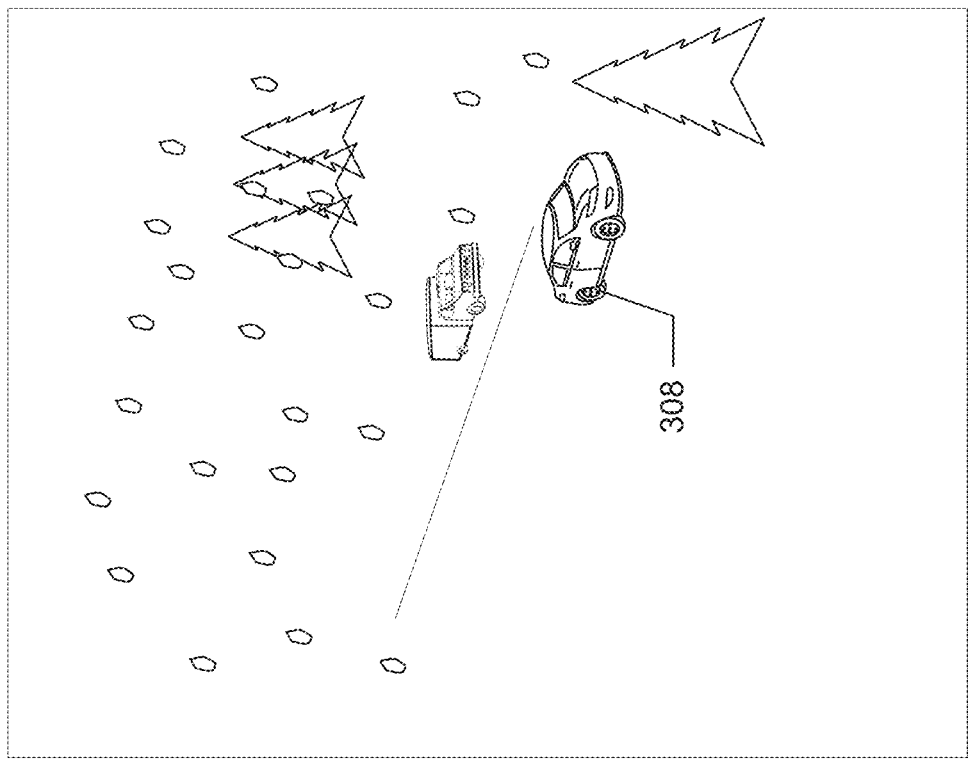
Figure 4D:
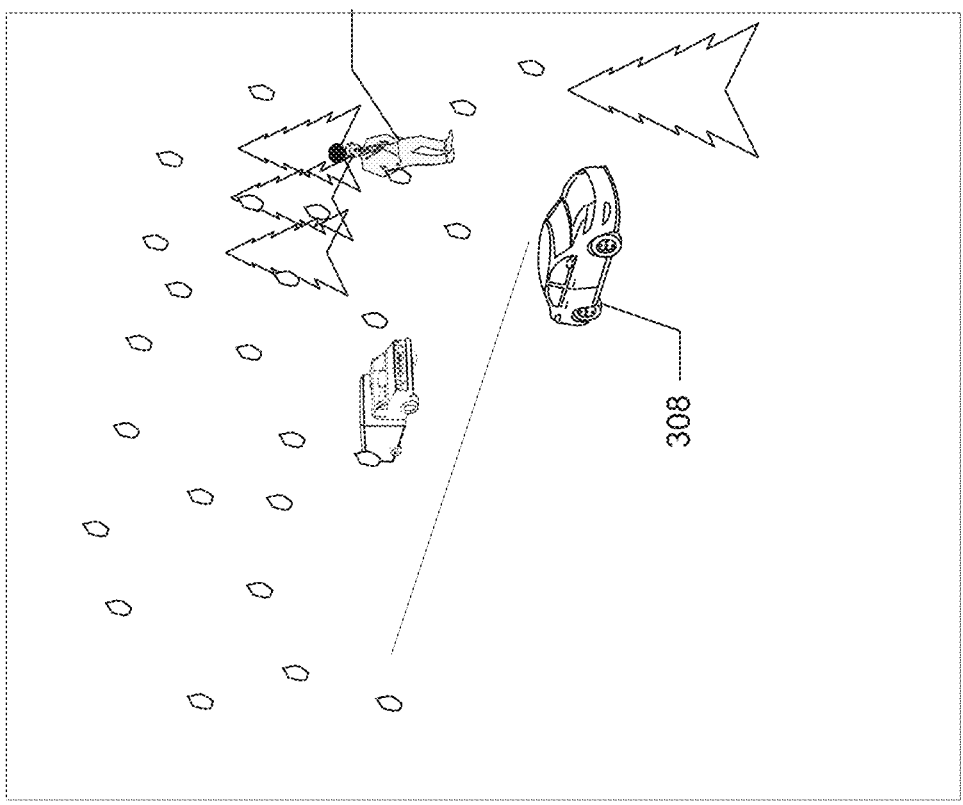

FIGS. 4B-4D exemplify video captured by the second officer's bodycam 320. FIG. 4B shows frames 4.3 and 4.4 in the sequence. Following frame 4.2, frame 4.3 shows the driver 306 pulling a gun 404 and pointing it at the first officer 302. At the same time, the bystander 402 is no longer seen in the frame. In frame 4.4, the first officer 302 brandishes his own gun 406 and appears to persuade the driver 306 to drop his gun 404. In the meantime, the bystander 402 appears again in frame 4.4, and now facing right.

FIG. 4C shows frames 4.5. and 4.6 in the sequence. Following from 4.4, frame 4.5 exhibits the first officer 302 leading the driver 306 to the squad car 314. The squad car 312 is not seen in this frames due to the positioning of the second officer 304 (specifically, the bodycam 320). At this time, the first officer 302 has turned away from the driver 306 and in so doing, his gun 406 is not visible. At the same time, the bystander 402 remains in the view, possibly to observe the scene. In frame 4.6, the first officer 302 has turned back to the right and his gun 406 is again visible. The driver 306 is not visible, however, presumably having been seated in the squad car 314. The bystander 402 remains in the scene but has turned to face left.

FIG. 4D, which includes frames 4.7 and 4.8, shows the aftermath of the traffic stop. These frames may have been captured by the same multimedia content source 110 that captured frames 4.1 and 4.2. Neither of the squad cars 312 or 314 are visible, nor are the first officer 302, the second officer 304, or the driver 306. The bystander 402 is visible in frame 4.7 but not in frame 4.8, having apparently left the scene with all of the activity gone.

The multimedia content captured in frames 4.1-4.8 may be streamed to, e.g., the remote location 104 and retrieved or input to the server 112 via the communication interface 202, for example for retrieval by the object detection module 216. Alternatively, or in addition, the multimedia content may be stored in a memory of the multimedia content source or another storage, and thereafter uploaded and stored in, e.g., the data store 224 for retrieval by the objection detection module 216.

The object detection, object tracking, matching, scoring, and automatic merging follows. That is, the object detection module 216 detects objects to be tracked in the multimedia content 232, the object tracking module 218 creates tracks for each tracked object, the comparing module 226 compares tracks that purport to have the same tracked object, the scoring module 228 generates a matching score for each match that falls within a high scoring tier for scores above a first threshold, within a low scoring tier for scores below a second threshold, and within a middle scoring tier for scores between the first threshold and the second threshold, inclusive, and described herein. In some embodiments, a matching score may represent a statistical likelihood that compared tracks match (e.g., a percentage or datapoint on an arbitrary scale). Furthermore, the tiers need not be divided into equal sizes; the high tier and low tier may be larger than the middle tier to bias the analysis toward producing fewer tracks for manual review, or the high tier may be larger than both the middle and low tiers to err on the side of caution in an analysis that redacts personal identifying features or information. In addition, a determination of "match" or "no match" may not be guaranteed accurate; over time, as determinations may prove sometimes to be inaccurate, feedback (manual or system-determined) may be used in retraining the model(s) and improve their accuracy.

Those tracks that score above the first threshold are input by the merging module 230, where they are automatically matched. Tracks that score below the second threshold are disregarded for further processing. Tracks that fall between the two thresholds are output for manual analysis, e.g., by the analyst 108. In this way, the number of tracks requiring manual analysis can be reduced, greatly reduced in some instances, compared with a system that requires manual review of all tracks. In some cases, hundreds of tracks may be reduced to tens of tracks. Even tens of tracks, however, can be reduced further in accordance with techniques disclosed herein, as the analyst 108 need be presented only with the mid-tier set of tracks (i.e., those tracks that fall within the middle scoring tier).

Figure 5A:
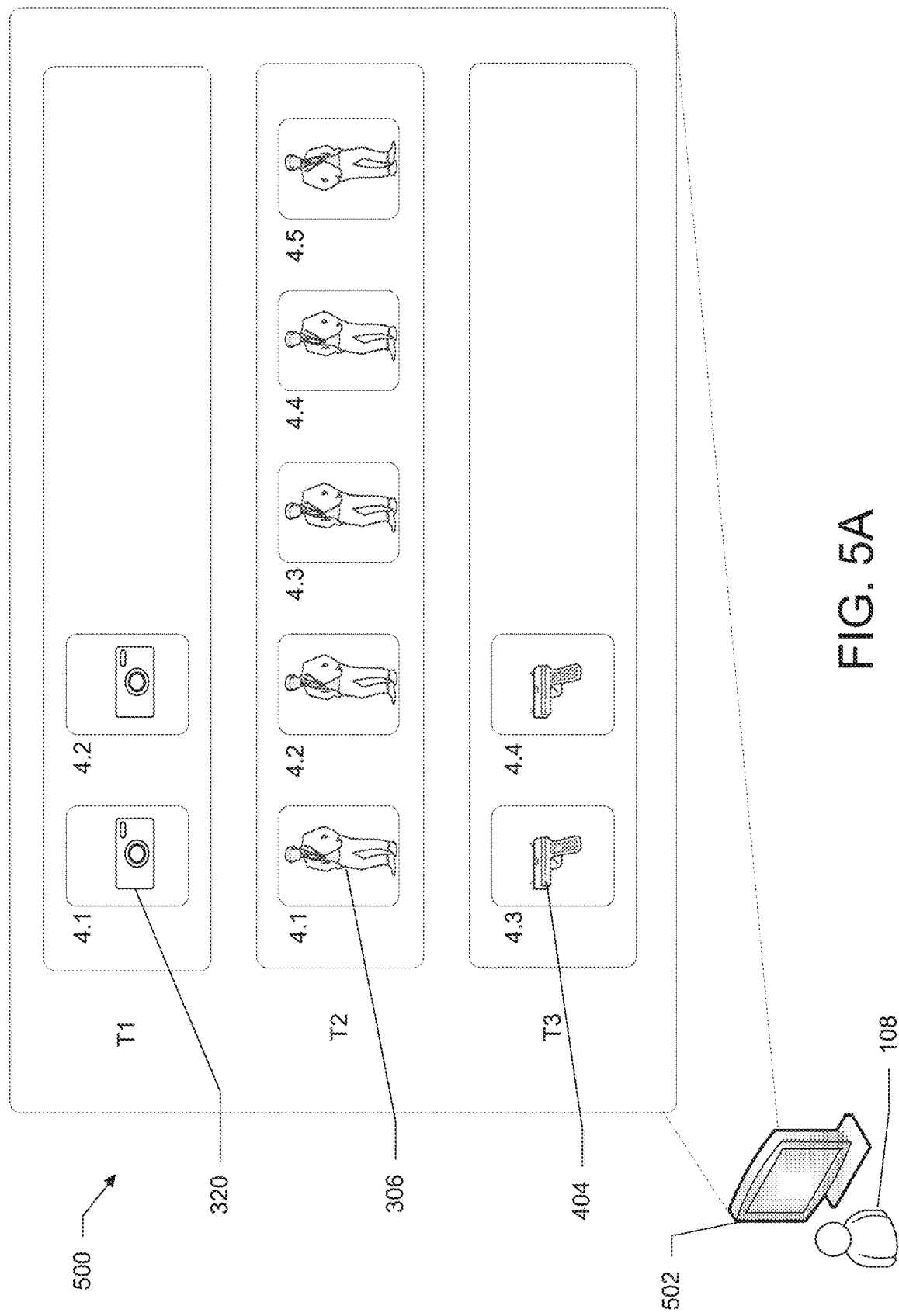
FIGS. 5A and 5B illustrate an example of an analyst and a display communicatively connected to a computing device corresponding to the server.
Figure 5B:
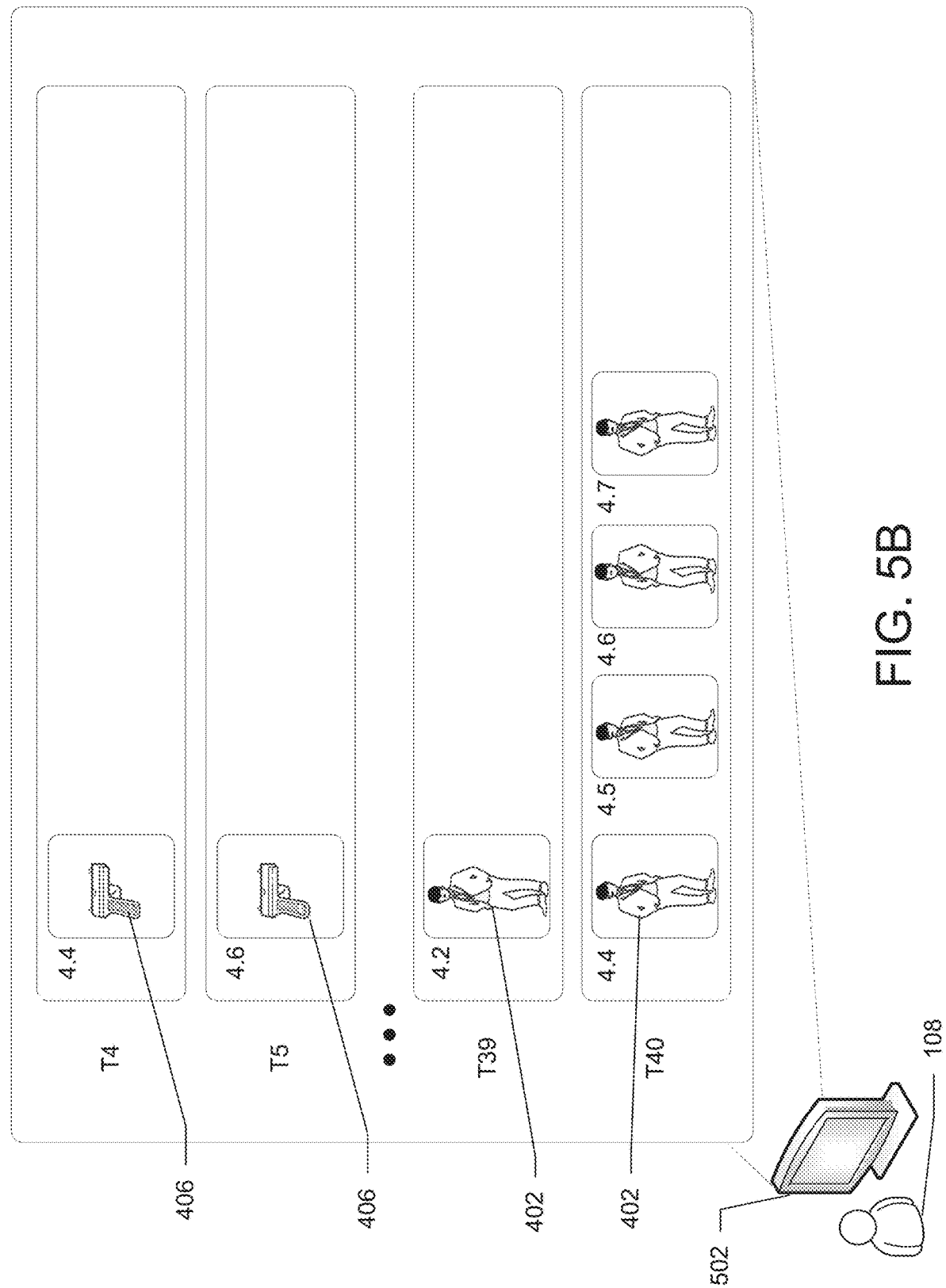

FIGS. 5A and 5B illustrate an example of the analyst 108 and a display 500 on, e.g., a monitor 502 communicatively connected to a computing device corresponding to the server 112. In some embodiments, the computing device need not be a server, but can be connected to the server 112 or even carry out one or more of the functions ascribed to the server 112.

FIG. 5A illustrates an example of three tracks T1, T2, and T3 derived from multimedia content received from one or more of the multimedia content sources 110. Tracks T1, T2, and T3 were scored between the first and second thresholds, and therefore output for manual analysis. In the present example, the multimedia content was captured at the traffic stop example described with respect to FIGS. 4A-4D, and output video comprising matched tracks provides the analyst the ability to indicate or perform operations with respect to each tracked object as described below.

The sequence of frames 4.1-4.8 were described in the example embodiment of FIGS. 4A-4D. In this example, consider that a plurality of objects are to be tracked. There is no lower or upper limit on the number of objects tracked, and they may be chosen by the analyst or other person or a computing device that operates according to a prescribed plan (e.g., the same object(s) or type of object(s) are frequently tracked). In the case of a prescribed plan, object(s) may be pre-grouped so as to be tracked according to concepts described herein, including without limitation the instant embodiment.

Returning to FIG. 5A, each track T1, T2, and T3 represents a number of frames in which a tracked object appears in consecutive frames. For example, the object tracked in T1 is the bodycam 320. When the object tracking module 218 tracks the bodycam 320 in frames 4.1-4.8, the bodycam 320 is detected in frames 4.1 and 4.2, but not in frames 4.3. Taken together, therefore, frames 4.1 and 4.2 are designated Track 1 (T1). Beyond frame 4.3, whether the bodycam 320 is detected again in the video is irrelevant to the determination of T1 because T1 begins with the first frame in which the bodycam 320 is detected (i.e., frame 4.1) and ends with the frame just before frame 4.3 (i.e., frame 4.2, the last consecutive frame after frame 4.1 in which the bodycam 320 is detected).

At least part of those frames may be displayed on the display 502 in a manner that allows the analyst 108 to review the bodycam 320 in each frame. For example, the display may show only the bodycam 320 (as in FIG. 5A, for simplicity), a portion of the frame in which the bodycam 320 appears, or the entire frame. Alternatively, or in addition, the entire frame or part thereof may be displayed, with the analyst 108 having the ability to zoom in or out to selected portions of the image, including a portion that includes the bodycam 320. In some examples, detecting the presence of the bodycam in frames 4.1 and 4.2 may be considered evidence that the officer was wearing the bodycam 320 in accordance with prescribed policies, although this may not be the only value to having tracked the bodycam 320.

As also shown in FIG. 5A, the driver 306 may be a tracked object. In this example, the driver 306 is detected in frames 4.1, 4.2, 4.3, 4.4, and 4.5, but not in frame 4.6. Taken together, therefore, frames 4.1-4.5 are designated Track 2 (T2). Beyond frame 4.6, whether the driver 306 is detected again in the video is irrelevant to the determination of T2, which may thus be designated corresponding to consecutive frames in which the driver 306 is detected. The driver 306 is turned to the left in frames 4.1, 4.2, 4.3, and 4.4, but turned to the right in frame 4.5. In some embodiments, as in this example, the object detection module 216 and/or the object tracking module may be able to detect and track the tracked object, even if it has different orientations in various frames. Similarly, the comparing module 226 and the scoring module 228 may be able to compare and score matches of tracked objects regardless of orientation. In some examples, tracking the driver 306 in frames 4.1-4.5 may provide evidence of the driver's presence and behavior at the scene, and likewise for the first officer 302 and second officer 304. In addition, or alternatively, a positive identification of the driver 306 permits the analyst 108 or downstream person or device to redact (e.g., blur) the driver's face for the purpose of dissemination to the media, yet retaining the original multimedia content as evidence. In this way, the law enforcement agency is not exposed to liability for falsely publicizing an innocent person as having committed a crime. Indeed, the face itself may be the tracked object. Again, this is but one use case for tracking the driver or face, which may have other value.

That T1 has some of the same frames of T2 may be a coincidence in some examples such as this one; as described elsewhere herein, various tracks can be analyzed for the presence of the tracked object. That is, T1 may be compared to another track that contains frames that also track the bodycam 320. Likewise, T2 may be compared to another track that contains frames that also track the driver 306. T1 is not compared to T2 because different respective objects (i.e., the bodycam 320 and the driver 306) are tracked in T1 and T2.

The driver's gun 404 may also be an object of interest, and so it is also tracked in this example. As shown in FIG. 5A, the gun 404 is not detected in frames 4.1 or 4.2, but is detected in frames 4.3 and 4.4. The gun 404 is also not detected in frame 4.5; therefore Track 3 (T3) contains consecutive frames 4.3 and 4.4.

FIG. 5B illustrates another display of frames from the video of the traffic stop example. Track 4 (T4) tracks the first officer's gun 406, which is detected in frame 4.4 only. Therefore, T4 has only one frame, not specifically because frame 4.4 is the only one of frames 4.1-4.8 in which the first officer's gun 406 is detected, but because it is the first frame in which the first officer's gun 406 is detected and also the frame just before the first frame (i.e., frame 4.5) in which the first officer's gun 406 is not detected following frame 4.4. The reason for the apparent disappearance in frame 4.5 is not necessarily evident (perhaps the gun was hidden from this view when the first officer 302 turned), but the reason is not relevant to analysis of the present example.

Subsequently in this example, the first officer's gun 406 may be detected again in frame 4.6 and not in frame 4.7. Frame 4.6 thus becomes the first frame in Track 5 (T5) and also the final frame in T5, because the track is stopped when the first officer's gun 406 is not detected in frame 4.7. Consequently, the first officer's gun 406 is a tracked object in two distinct tracks, T4 and T5. T4 and T5 are presented to the analyst 108 for manual comparison because the comparison by the comparing module 226 was scored by the scoring module 228 in the middle between the first threshold and the second threshold. In some examples, tracking the first officer's gun 406 in frames 4.4 and 4.6 may provide evidence of the appropriateness of drawing a weapon in the situation at hand.

In a similar way, the bystander 402 may be the tracked object in T6 and T7. The bystander 402 is not detected in frame 4.1 but is detected, first, in frame 4.2. Subsequently the bystander appears to have continued on because he is not detected in frame 4.3, but then appears in frames 4.4-4.7 and not in frame 4.8. Consequently T6 is formed from frame 4.2 alone and T7 from consecutive frames 4.4-4.7. The bystander 402 faces left in T6 (frame 4.2), right in frames 4.4 and 4.5 of T7, back to the left again in frame 4.6 of T7, and to the right in frame 4.7 of T7. This illustrates that, in some embodiments, the bystander 402 may be facing in more than one direction in a single track as well as in multiple tracks, yet still be detected and subjected to matching. Consequently, the bystander 402 is a tracked object in two distinct tracks, T6 and T7. T6 and T7 may thus be presented to the analyst 108 for manual comparison because the comparison by the comparing module 226 was scored by the scoring module 228 in the middle between the first threshold and the second threshold. In some examples, tracking the bystander 402 in this way permits redaction of the bystander's face for privacy purposes, for example.

Figure 6:
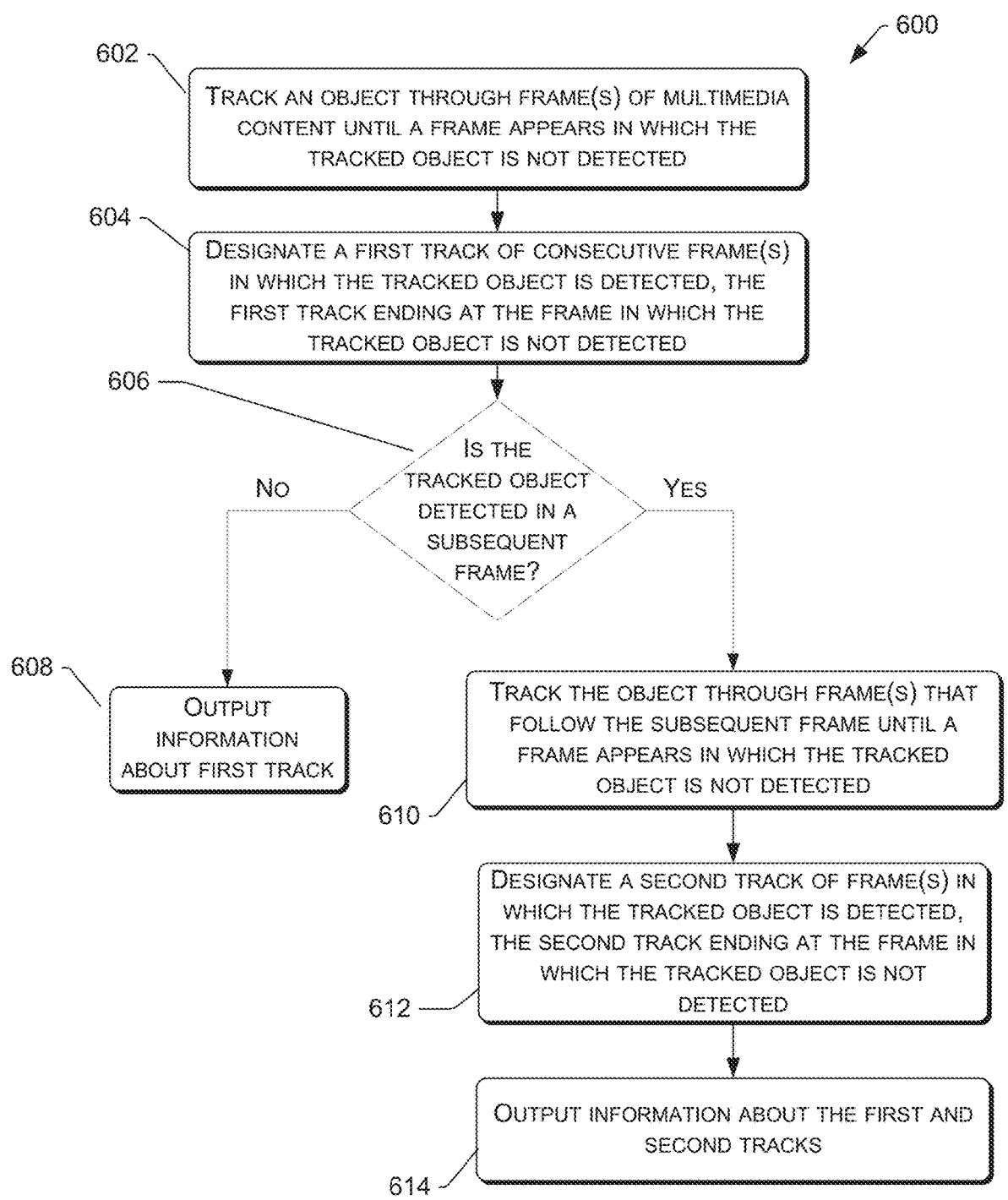
FIG. 6 is a flow diagram 600 that depicts a methodological implementation of at least one aspect of the techniques for implementing the object tracking and track creation as described herein.

FIG. 6 is a flow diagram 600 that depicts a methodological implementation of at least one aspect of the techniques for implementing the object tracking and track creation as described herein. In the following discussion of FIG. 6, continuing reference is made to the elements and reference numerals shown in and described with respect to FIGS. 1-5B. Further, certain operations may be ascribed to particular elements or components shown in previous figures. However, alternative implementations may execute certain operations in conjunction with or wholly within a different element or component. Furthermore, to the extent that certain operations are described in a particular order, it is noted that some operations may be implemented in a different order to produce similar results.

At block 602, a tracking module, such as the tracking module 218, may track an object through multimedia content. For example, the object may be tracked through one or more video frames subsequent to the first frame in which the tracked object is detected until a frame appears in which the tracked object is not detected. This consecutive sequence of frames in which the tracked object is detected may be dubbed a "track.". The track may extend forward or in reverse chronologically from the first frame until the tracked object is no longer detected. The tracking of frames may in some examples extend both forward and backward, such as when the tracked object is first detected in a frame that is not at the end of a sequence of frames in which the object appears. That is, if the tracked object is first detected, or first determined to be of interest, in frame 20 but also appears in frames 17-19 and 21-23, the track may be defined as including frames 17-23.

In some embodiments, the multimedia content may be retrieved from a data store, such as the data store 224. The multimedia content may also, or in the alternative, be streaming data, in which objects may be tracked by the tracking module in real time. In some embodiments, the object may be sought, i.e., identified for tracking before the detection, or may become an object of interest during review of the multimedia content by an object detection module such as the object detection module 216. In some embodiments, the tracked object may be determined as an object of interest when it first appears in a particular frame that may not be the first frame in a sequence of frames, in which case the object may be tracked chronologically going forward from there and/or in reverse.

At block 604, an object tracking module, such as the object tracking module 218, may designate a first track of consecutive frame(s) in which the tracked object is detected, the first track ending at the frame in which the tracked object is not detected. In some embodiments, a track may begin immediately after a frame in which the tracked object is not detected and end with a frame that immediately precedes the next frame in which the tracked object is not detected. In other embodiments, the track may begin at the first frame of multimedia content. However, the first frame in which the tracked object is detected need not necessarily be preceded or succeeded by a frame in which the tracked object is not detected, because the object tracking module may begin with a frame in which the tracked object is detected and track the object forward and/or backward. For example, tracking of the tracked object may begin in response to a trigger such as movement, or tracking may be set to start periodically (e.g., after every ten frames following a frame in which the tracked object is not detected). The track may be entered with an arbitrary track name (e.g., T1) in its corresponding metadata. The minimum number of consecutive frames is not limited to two; different numbers of frames may be chosen for different purposes. However, a track has a plurality of frames in at least one example.

Object tracking may continue for a tracked object after a completed track is designated—an object may be detected in more than one track. At block 606, the object tracking module (or other server component) may determine whether the tracked object has been found in a subsequent frame following an already designated track. For example, the tracked object may be detected in a frame following an end (forward or backward) of the first track. If the tracked object is not detected in a subsequent frame, the process 600 proceeds to block 608. If the tracked object is detected in a subsequent frame, the process 600 proceeds to block 610.

At block 608, no subsequent frame having been reached in which the tracked object is again detected, the object tracking module or other server component may output information about T1. This does not necessarily mean that the tracked object is not present in other frames of the multimedia content; tracking may be set to end after a predetermined number of frames or period of time, or only multimedia content received from a designated multimedia content source or sources may be considered. In some embodiments, the track information may be output at the completion or designation of each track. The information about the first track may include its metadata, which may include its file name or track name as well as the frame identifiers for the first frame and last frame of the track.

At block 610, the tracked object having been detected in a subsequent frame, the object tracking module may track the object through one or more frames that follow the subsequent frame until a frame appears in which the tracked object is not detected. Block 610 may be similar to block 602.

At block 612, the object tracking module may designate another, second track of consecutive frame(s) in which the tracked object is detected, the second track ending at the frame in which the tracked object is not detected. Block 612 may be similar to block 604.

At block 614, the object tracking module or other server component may output information about the first and second tracks. This does not necessarily mean that the tracked object is not present in other frames of the multimedia content; tracking may be set to end after a predetermined number of tracks, frames, or period of time, or only multimedia content received from a designated multimedia content source or sources may be considered. In some embodiments, the track information may be output at the same time, or at the completion or designation of each track. The information about the first track may include its metadata, which may include its file name or track name, and/or the frame identifiers for the first and last frames of each track.

Figure 7:
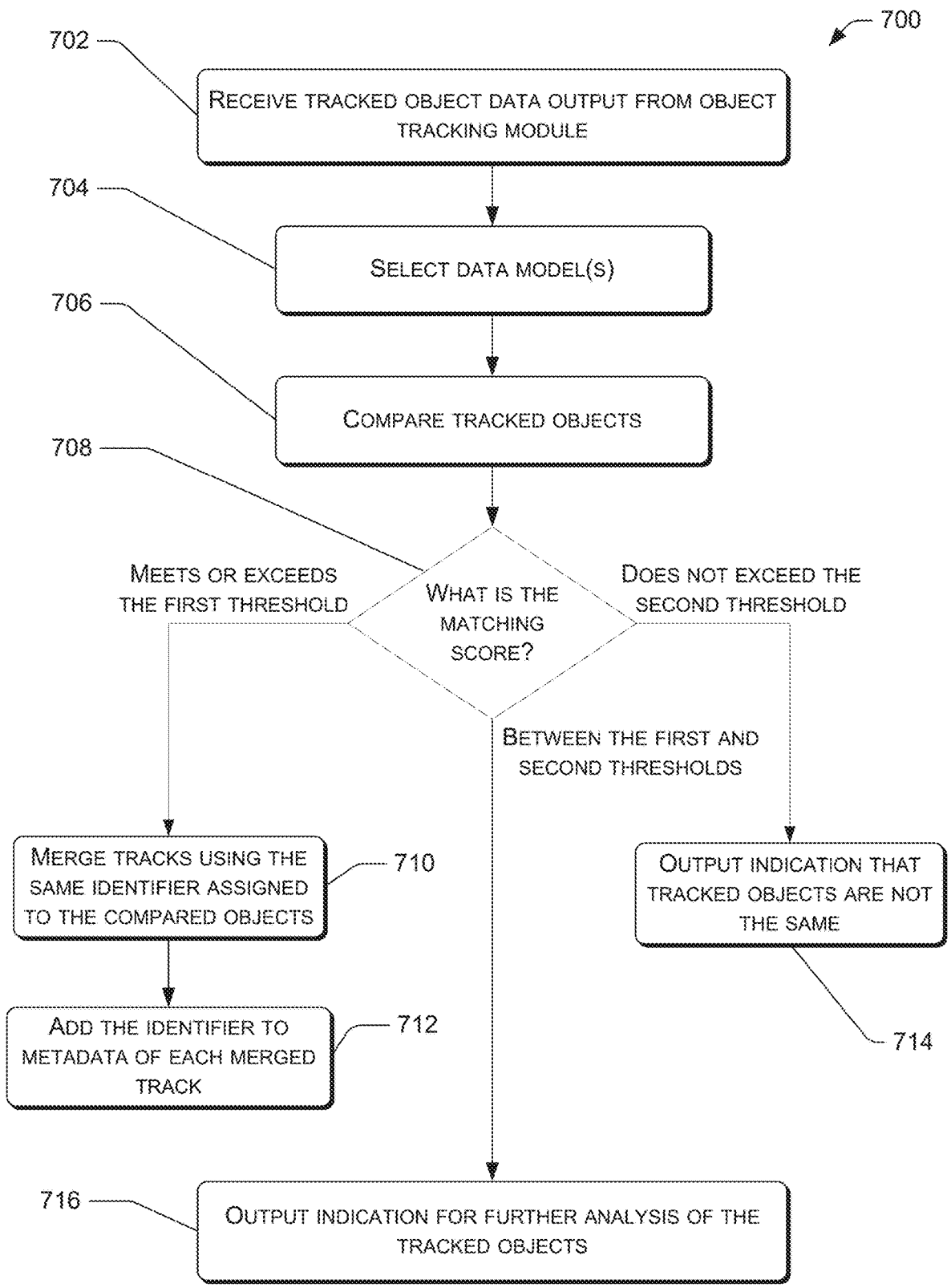
FIG. 7 is a flow diagram 700 that depicts a methodological implementation of at least one aspect of the techniques for implementing the track merging described herein.

FIG. 7 is a flow diagram 700 that depicts a methodological implementation of at least one aspect of the techniques for implementing the track merging described herein. In the following discussion of FIG. 7, continuing reference is made to the elements and reference numerals shown in and described with respect to FIGS. 1-5B. Further, certain operations may be ascribed to particular elements or components shown in previous figures. However, alternative implementations may execute certain operations in conjunction with or wholly within a different element or component. Furthermore, to the extent that certain operations are described in a particular order, it is noted that some operations may be implemented in a different order to produce similar results.

At block 702, an analytics engine, such as the analytics engine 222, may receive tracked object data output from the object tracking module. This output may include data that can be input as a dataset to train a data model or to run a trained data model on the data, for example. In either of these contexts, receiving the dataset for execution on a data model may accompany a request or act as a request to apply one or more data models.

At block 704, the analytics engine may select a trained data model or models to be run on the input tracked object data. In the illustrated example, the request may identify the model(s) to run. A trained model is one that has been trained to output results that can be considered as correct with a statistical level of confidence. Alternatively, or in addition, the analytics engine may determine the model(s) to run based on the content identification, or the model(s) may be pre-selected to run on any tracked content input.

At block 706, a comparing module such as the comparing module 226 may run the trained model(s) on the tracked object data. In time, the model may prove to be unable to produce results that are consistently correct. However, additional training on new data will improve the model results. In the present illustration, a reliable model will output a result indicating whether the tracked information data shows that the tracked object in each track (here, in Track 1 and Track 2) are the same, different, or uncertain, with a statistical level of confidence.

At block 708, a scoring module such as the scoring module 228 may determine a matching score from the output of the data model(s). Three tiers of matching may be designated to correspond to "match," "no match," and "possible match," respectively, based on the matching score. In some examples the "match" tier may correspond at least to matching scores that exceed a first threshold, the "no match" tier may correspond at least to matching scores that do not meet a second threshold, and the "possible match" tier may correspond at least to matching scores that fall between the "match" and "no match" tiers. The first threshold may be assigned to the "match" tier or to the "possible match" tier; likewise, the second threshold may be assigned to the "possible match" tier or to the "no match" tier. In this example, the "match" tier includes the first threshold (i.e., the matching score indicates a match of the compared tracks if the matching score meets or exceeds the first threshold), the "no match" tier includes the second threshold (i.e., the matching score indicates that the compared tracks do not match if the matching score does not exceed the second threshold), and the "possible match" tier is less than the first threshold and greater than the second threshold (i.e., the matching score does not indicate that the compared tracks match or that they do not match).

If the matching score meets or exceeds the first threshold, the scoring module may determine that the compared tracks are considered to match and the process may continue at block 710. If the matching score does not exceed the second threshold, the scoring module may determine that the compared tracks are considered to not match and the process may continue at block 714. If the matching score is between the first and second thresholds, scoring module may determine that the compared tracks are considered neither to match nor to not match and the process continues at block 716.

At block 710, a merging module such as the merging module 230 may merge Track 1 and Track 2, creating a single "track" under the same name (for example, track name or file name). In this regard, the original multimedia content itself is not altered; rather, the tracks are "merged" by giving them the same name. For example, supposing that the tracked object is a particular person's face that is detected in both Track 1 and Track 2, and the first threshold is 70. If the model output indicates that the face detected in each track has a 90 match score (i.e., the match score exceeds the first threshold and is in the high tier), the model output determines that the compared tracks are a match. In this situation, Track 1 and Track 2 can be "merged" by giving each the same name, for example "Track 1" or "Face 1" in the metadata. As a consequence, a keyword or file search for the name can produce the frames in which the face appears. As one application of this technique, the frames can be modified, e.g., to obscure the face. It is to be emphasized that the original multimedia content file/stream is not altered; the altered frames can be part of a new file. Using the example of an obscured face (obscured by, e.g., blurring), the new file may be displayed or distributed without exposing the person's identity.

Indeed, by this technique the person's identity need not be determined or recorded at all to achieve the purpose. Considering a newsworthy event such as a crime, an innocent bystander can be anonymized in a video provided to the press. In another example, an analyst seeking only a small subset of a much larger volume of multimedia content is able to reduce the size of content to only that which is relevant to the analyst's purpose.

At block 712, the merging module or other component may add the single file name to metadata of each merged track. This facilitates retrieval of the relevant information by, e.g., keyword or file name search. Because the original multimedia content is not altered, a retrieval of other content is not affected by the merger or change/addition of name to the merged track. As well, new tracks can be created from the original multimedia content for the tracked object and run on a new (e.g., retrained) model. New tracks can also be created for other tracked objects, which may or may not be found in some or all of the same frames that the previously tracked objects were detected. In the illustrated example, a license plate of a car appearing in the scene may need to be redacted, and the license plate may appear in some of the same frames as the face. New tracks ("Track 3" and "Track 4") may be created in which the tracked license plate is detected and, if the model indicates that the license plate is the same in both tracks, the license plate can be redacted as well. Similarly, a tracked object that is intended to be noticed (e.g., a gun) can be highlighted (rather than redacted) by a similar technique.

If the matching score does not exceed the second threshold, the process may continue at block 714. In the illustrated example, supposing that the second threshold is 40 and the matching score is 30 (i.e., the matching score does not meet the second threshold and is in the low tier), the scoring module may determine that the compared tracks are considered to not match. At block 714, the scoring module or another component may output an indication that the tracked objects are not the same, in which case the tracks are not merged.

A matching score in the middle tier (i.e., between the first and second thresholds) is regarded as indeterminate, in which case the process 700 continues to block 716. At block 716, the scoring module or another component outputs an indication for further (e.g., manual) analysis of the tracked objects. In some embodiments, further analysis may be performed by a human analyst. The further analysis may be informed by information provided by the analytics engine such as, without limitation, whether the score is closer to one threshold or the other, and how close) or a priority level of further analysis (e.g., highlighting a weapon for evidentiary purposes may be a higher priority than obscuring a license plate number).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform operations comprising:
    tracking an object through a first plurality of frames of multimedia content until a first frame appears in which the tracked object is not detected;
    designating as a first track at least one consecutive frame of the first plurality of frames in which the tracked object is detected, the first track ending before the first frame and each frame of the first track including the tracked object;
    determining whether the tracked object is detected in a second frame subsequent to the first frame in which the tracked object is not detected; and
    performing either:
        in response to determining that the tracked object is not detected in the second frame subsequent to the first frame, outputting information about the first track; or
        in response to determining that the tracked object is detected in the second frame subsequent to the first frame:
            tracking the tracked object through a second plurality of frames that follow the second frame until a third frame appears in which the tracked object is not detected;
            designating as a second track the second plurality of frames in which the tracked object is detected, the second track including the second frame and ending before the third frame; and
            outputting information about the first and second tracks, each frame of the first and second tracks including the tracked object.

2. The one or more non-transitory computer-readable media of claim 1, wherein the operations further comprise:
    receiving tracked object data about the tracked objects in the first and second tracks;
    selecting one or more data models;
    comparing the tracked objects in the first and second tracks using the selected one or more data models; and
    outputting an indication for further analysis of compared tracked objects that fail to meet criteria defined by matching thresholds.

3. The one or more non-transitory computer-readable media of claim 2, wherein the operations further comprise:
    determining a matching score based on the comparison of the tracked objects;
    if the matching score meets or exceeds a first threshold of the matching thresholds:
        merging the compared tracks using the same identifier assigned to the compared tracks; and
        adding the identifier to metadata of each of the compared tracks;
    if the matching score does not exceed a second threshold of the matching thresholds that is less than the first threshold, outputting an indication that the tracked objects are not a match; and
    if the matching score falls between the first and second thresholds, outputting the indication for further analysis of the compared tracked objects.

4. The one or more non-transitory computer-readable media of claim 3, wherein:
    the matching score represents a statistical likelihood that the compared tracked objects are the same object, matching scores that meet or exceed the first threshold are in a high tier, matching scores that do not exceed the second threshold are in a low tier, and matching scores that fall between the first and second thresholds are in a middle tier; and
    the operations further comprise automatically processing the tracked objects in the merged tracks.

5. The one or more non-transitory computer-readable media of claim 4, wherein processing the tracked objects in the merged tracks comprises:
    redacting a feature of the tracked objects.

6. The one or more non-transitory computer-readable media of claim 4, wherein processing the tracked objects in the merged tracks comprises:
    highlighting the tracked objects.

7. The one or more non-transitory computer-readable media of claim 4, wherein the low, middle, and high tiers are not all the same size.

8. A computer-implemented method, comprising:
    tracking an object through a first plurality of frames of multimedia content until a first frame appears in which the tracked object is not detected;
    designating as a first track at least one consecutive frame of the first plurality of frames in which the tracked object is detected, the first track ending before the first frame and each frame of the first track including the tracked object;
    determining whether the tracked object is detected in a second frame subsequent to the first frame in which the tracked object is not detected; and
    performing either:
        in response to determining that the tracked object is not detected in the second frame subsequent to the first frame, outputting information about the first track; or
        in response to determining that the tracked object is detected in the second frame subsequent to the first frame:
            tracking the tracked object through a second plurality of frames that follow the second frame until a third frame appears in which the tracked object is not detected;
            designating as a second track the second plurality of frames in which the tracked object is detected, the second track including the second frame and ending before the third frame; and
            outputting information about the first and second tracks, each frame of the first and second tracks including the tracked object.

9. The computer-implemented method of claim 8, further comprising:

receiving tracked object data about the tracked objects in the first and second tracks;
selecting one or more data models;
comparing the tracked objects in the first and second tracks using the selected one or more data models; and
outputting an indication for further analysis of compared tracked objects that fail to meet criteria defined by matching thresholds.

10. The computer-implemented method of claim 9, further comprising:
determining a matching score based on the comparison of the tracked objects;
if the matching score meets or exceeds a first threshold of the matching thresholds:
merging the compared tracks using the same identifier assigned to the compared tracks; and
adding the identifier to metadata of each of the compared tracks;
if the matching score does not exceed a second threshold of the matching thresholds that is less than the first threshold, outputting an indication that the tracked objects are not a match; and
if the matching score falls between the first and second thresholds, outputting the indication for further analysis of the compared tracked objects.

11. The computer-implemented method of claim 10, wherein:
the matching score represents a statistical likelihood that the compared tracked objects are the same object, matching scores that meet or exceed the first threshold are in a high tier, matching scores that do not exceed the second threshold are in a low tier, and matching scores that fall between the first and second thresholds are in a middle tier; and
the method further comprises automatically processing the tracked objects in the merged tracks.

12. The computer-implemented method of claim 11, wherein processing the tracked objects in the merged tracks comprises:
redacting a feature of the tracked objects.

13. The computer-implemented method of claim 11, wherein processing the tracked objects in the merged tracks comprises:
highlighting the tracked objects.

14. The computer-implemented method of claim 11, wherein the low, middle, and high tiers are not all the same size.

15. A computing device, comprising:
one or more processors; and
a memory having one or more non-transitory computer-readable media that store computer-executable instructions that upon execution cause the one or more processors to perform operations comprising:
tracking an object through a first plurality of frames of multimedia content until a first frame appears in which the tracked object is not detected;
designating as a first track at least one consecutive frame of the first plurality of frames in which the tracked object is detected, the first track ending before the first frame and each frame of the first track including the tracked object;
determining whether the tracked object is detected in a second frame subsequent to the first frame in which the tracked object is not detected; and performing either:
in response to determining that the tracked object is not detected in the second frame subsequent to the first frame, outputting information about the first track; or
in response to determining that the tracked object is detected in the second frame subsequent to the first frame:
tracking the tracked object through a second plurality of frames that follow the second frame until a third frame appears in which the tracked object is not detected;
designating as a second track the second plurality of frames in which the tracked object is detected, the second track including the second frame and ending before the third frame; and
outputting information about the first and second tracks, each frame of the first and second tracks including the tracked object.

16. The computing device of claim 15, wherein the operations further comprise:
receiving tracked object data about the tracked objects in the first and second tracks;
selecting one or more data models;
comparing the tracked objects in the first and second tracks using the selected one or more data models; and
outputting an indication for further analysis of compared tracked objects that fail to meet criteria defined by matching thresholds.

17. The computing device of claim 16, wherein the operations further comprise:
determining a matching score based on the comparison of the tracked objects;
if the matching score meets or exceeds a first threshold of the matching thresholds:
merging the compared tracks using the same identifier assigned to the compared tracks; and
adding the identifier to metadata of each of the compared tracks;
if the matching score does not exceed a second threshold of the matching thresholds that is less than the first threshold, outputting an indication that the tracked objects are not a match; and
if the matching score falls between the first and second thresholds, outputting the indication for further analysis of the compared tracked objects.

18. The computing device of claim 17, wherein:
the matching score represents a statistical likelihood that the compared tracked objects are the same object, matching scores that meet or exceed the first threshold are in a high tier, matching scores that do not exceed the second threshold are in a low tier, and matching scores that fall between the first and second thresholds are in a middle tier; and
the operations further comprise automatically processing the tracked objects in the merged tracks.

19. The computing device of claim 18, wherein processing the tracked objects in the merged tracks comprising:
redacting a feature of the tracked objects.

20. The computing device of claim 18, wherein processing the tracked objects in the merged tracks comprising:
highlighting the tracked objects.

* * * * *